United States Patent
Parl et al.

(10) Patent No.: US 6,259,404 B1
(45) Date of Patent: Jul. 10, 2001

(54) POSITION LOCATION SYSTEM AND METHOD

(75) Inventors: Steen A. Parl, Arlington; Julian Bussgang, Lexington; Jay Weitzen, Chelmsford; James M. Zagami, Woburn, all of MA (US)

(73) Assignee: Signatron Technology Corporation, Concord, MA (US)

( * ) Notice: Subject to any disclaimer, the term of this patent is extended or adjusted under 35 U.S.C. 154(b) by 0 days.

(21) Appl. No.: 09/268,179

(22) Filed: Mar. 15, 1999

Related U.S. Application Data

(63) Continuation-in-part of application No. 08/573,057, filed on Dec. 15, 1995, now Pat. No. 5,883,598.

(51) Int. Cl.[7] .................................................. G01S 3/02
(52) U.S. Cl. ............................................................. 342/457
(58) Field of Search .................................. 342/457, 465, 342/463

(56) References Cited

U.S. PATENT DOCUMENTS

| | | | |
|---|---|---|---|
| 3,680,121 | * 7/1972 | Anderson et al. | 342/457 |
| 4,385,301 | * 5/1983 | Tricoles et al. | 342/445 |
| 4,651,156 | * 3/1987 | Martinez | 342/457 |
| 4,728,959 | * 3/1988 | Maloney et al. | 342/457 |
| 4,891,650 | 1/1990 | Sheffer | 342/457 |
| 4,916,455 | 4/1990 | Bent et al. | 342/457 |
| 5,055,851 | 10/1991 | Sheffer | 342/457 |
| 5,218,367 | 6/1993 | Sheffer et al. | 342/457 |
| 5,225,809 | 7/1993 | Bunn | 340/574 |
| 5,293,642 | 3/1994 | Lo | 455/33.1 |
| 5,317,323 | 5/1994 | Kennedy et al. | 342/457 |
| 5,327,144 | 7/1994 | Stilp et al. | 342/387 |
| 5,365,516 | 11/1994 | Jandrell | 370/18 |
| 5,515,419 | 5/1996 | Sheffer | 379/58 |
| 5,592,180 | 1/1997 | Yokev et al. | 342/450 |

FOREIGN PATENT DOCUMENTS

| | | |
|---|---|---|
| 0 470 272 A1 | 8/1990 | (EP) . |
| 0 583 523 A2 | 2/1994 | (EP) . |
| 2 280 327A | 1/1995 | (GB) . |
| 6-252832 | 9/1994 | (JP) . |
| 7-274240 | 10/1995 | (JP) . |
| WO 88/01061 | 2/1988 | (WO) . |
| WO 95/14935 | 6/1995 | (WO) . |
| WO 95/14936 | 6/1995 | (WO) . |
| WO 95/26510 | 10/1995 | (WO) . |
| WO 96/25673 | 8/1996 | (WO) . |

OTHER PUBLICATIONS

Kennedy, J., et al., "Direction Finding and 'Smart Antennas' Using Software Radio Architectures," *IEEE Communications Magazine*, pp. 62–68, May 1995.

* cited by examiner

Primary Examiner—Gregory C. Issing
(74) Attorney, Agent, or Firm—Hamilton, Brook, Smith & Reynolds, P.C.

(57) ABSTRACT

A position location system includes multiple base stations spaced over a region. A remote unit within the region transmits a locating signal which is received by the base stations. The base stations report amplitude, phase and time data related to the locating signal to a control station. The control station includes a processor and memory that combine the data from all of the participating base stations to directly compute an optimal estimate of the location of the portable unit. The control station generates a locator function based upon the probability that the portable unit is located at a particular position. By optimizing the locator function, the error in the computation is minimized to produce an accurate position estimate.

3 Claims, 11 Drawing Sheets

POSITION LOCATION SYSTEM AND METHOD

CROSS REFERENCE TO RELATED APPLICATION

This application is a continuation-in-part of a prior U.S. patent application Ser. No. 08/573,057 filed Dec. 15, 1995 now U.S. Pat. No. 5,883,598 entitled "Position Location System and Method," the entire teachings of which are hereby incorporated by reference.

BACKGROUND OF THE INVENTION

This application relates generally to radio based position location systems and in particular to a generalized method which is applicable regardless of the number of base station antennas, and which compensates for unknown delays, phase shifts, and frequency shifts in received signals.

It is known that widely deployed radio communications network equipment such as cellular and paging system base stations can be used to provide position information for remote subscriber units. Such a position location system includes multiple base stations arranged in a predetermined pattern over a large region and spaced apart at relatively large distances, typically on the order of a few miles. To determine the location of an object within the region among the base stations, plural base stations receive a signal, such as a cellular phone signal, from the object. By analyzing the phase of the signals received, the location of the object is estimated.

Typical systems employ one of two common position location approaches. One of the approaches is called direction finding (DF) or angle of arrival and the other is known as pseudo ranging (PR) or time difference of arrival (TDOA). The direction finding method uses an antenna array such as a phased array at each base station to receive the signal from the object and determine its angle of arrival at the base station. By analyzing the difference in phase of the signal received at each antenna in the array, each of the plural base stations generates an estimate of the direction to the object. The object's location is estimated to be at the point of intersection of directional lines projected from each of the plural base stations at the computed angular directions.

In pseudo ranging systems, for each pair of base stations, the difference in time of arrival of the signal from the object at each base station is computed from the phase of the received signals. This time difference defines a hyperbola for each independent pair of base stations. The point at which the hyperbolas intersect provides an estimate of the location of the object.

Both of these common approaches to position location suffer from inherent inaccuracies. Since the phased arrays of antennas cannot precisely determine the angle of arrival of the signal, the direction finding approach actually does not result in several lines intersecting at one common point. Rather, the lines intersect at several points forming a region within which the object should be located. This region can be quite large depending upon certain variables such as elevation, signal strength, etc. The pseudo ranging approach is also inherently inaccurate since multiple hyperbolas do not intersect at the same point. This and other inaccuracies also result in determining a region in which the object may be located, rather than a precise position location. See, for example, Joseph P. Kennedy, et al., *Passive High Accuracy Geolocation System and Method*, U.S. Pat. No. 5,317,323, issued May 31, 1994.

At least one position location system has applied both direction finding and pseudo ranging to determine object location. However, the two approaches are applied separately, with the direction finding or angle of arrival approach being applied only to eliminate multipath errors from the location estimate.

SUMMARY OF THE INVENTION

The present invention is directed to a position location system and method which determine the position of an object without the inaccuracies inherent in prior systems. The system of the invention includes a remote subscriber unit, typically positioned at the object or person to be located, which transmits a locating signal into a region. A plurality of base stations receive the locating signal from the remote unit. Each base station includes at least one antenna that receives the locating signal and a receiver coupled to the antenna that generates a representative signal indicative of amplitude and phase in the locating signal as it is received at the antenna. A minimal system requires at least three antennas of which two can be located at three separate base stations, or two antennas located at one base station and one antenna located at another base station.

A processor receives the representative signals from the base stations and combines information indicative of amplitude and phase in the locating signal as received at the base stations to determine the position of the remote unit.

The locating signal comprises two or more single-frequency tones. Each locating signal tone can be at a different frequency. The tones can be transmitted at is different times, or, in an alternative embodiment, they can be transmitted simultaneously. Because only single-frequency tones are used as the locating signal instead of complicated modulated signals, substantial transmission circuitry is eliminated.

More particularly, receivers receive transmissions composed of tones from the transmitting remote unit, and select certain segments of one or more of the transmitted tones to determine their respective amplitudes and phases, together called phasors. The phasors are measured by correlation with local synchronous reference tones, having the same frequency at all base stations. When the received tones are shifted in frequency, due to oscillator offsets or Doppler shifts, the resulting frequency deviation can also be measured. The phasors, the frequency deviation, and time of measurement, along with other measured values deemed necessary for other purposes such as calibration and identification, are then forwarded to a central processor.

The central processor operates on a subset (or all) of the measured values received from the base stations to estimate location. The processor uses a two step algorithm where in Step 1 the measured values received from the base stations surrounding the region are used to define a function, called the locator function, which has location coordinates as arguments. The locator function is selected to have the following key properties:

1. It depends on both amplitude and phase measurements from all base stations, antennas, and tones being used. Specifically, the coordinates of the maximum of the locator function depends on amplitude and phase of the received phasors.
2. It does not rely on knowledge of the transmitted power.
3. It has at least one local maximum near the actual location.
4. Generally, but particularly in the absence of multipath, the local maximum will be closer to the actual location when the signal to noise ratio is higher.

5. There may be several local maxima (ambiguous peaks). However, there will usually be a unique global maximum within a given region when a sufficient number of base stations, antenna elements, or tones are used. As an example, for three single-antenna base stations, and two tones transmitted from within the triangular region formed by the base stations, the function will generally have a single peak within that region when the tones are closely spaced in frequency.

6. Motion of the transmitting unit and the frequency offset caused by an imprecise local oscillator can be estimated as a by-product of the process generating the function. One way is to ignore motion and estimate the constant frequency offset of the transmitting unit by averaging the frequency deviations measured at each base station. Another way is to estimate frequency offset and motion independently and use the resulting estimates to adjust the locator function. A third way is to, at the outset, define a locator function that depends on motion and frequency offset in addition to location.

In Step 2, the processor searches for the maximum of the locator function by computing the function value at points selected by the particular search algorithm. Such algorithms are well known. This search may be aided by a priori knowledge to help speed up the search or to resolve any ambiguities that may remain. This search yields the estimated location, to compute the position of the object directly, without the need for projecting lines at angles of arrival or computing the intersection of hyperbolas defined by pairs of base stations.

In one embodiment, in the case of two-dimensional location, the processor uses the received base station data to compute the locator function in two dimensions, x and y, in which x and y are coordinates in a Cartesian coordinate system describing position within the region. The locator function defines the error involved in a position determination for each point in the Cartesian coordinate system. That is, for each point at x,y, the locator function $A(x,y)$ depends upon the probability that the portable unit is located at that particular point x,y. The processor optimizes the locator function to select a point x,y at which the associated error is minimized. That point x,y is taken as the estimate of the location of the portable unit.

Any of several different optimization procedures can be used to optimize the locator function $A(x,y)$. For example, in one embodiment, the processor first obtains a rough estimate of the object's location by a conventional method such as triangulation. Next, the processor selects six points x,y that are in close proximity to the estimated point. The locator function $A(x,y)$ is solved for each of the x,y points to obtain six values. The six computed values are then used to define a parabolic surface. The point x,y at which the maximum value of the parabolic surface occurs is then taken as the estimate of the object's location.

Other optimization approaches can also be used. For example, a standard technique such as an iterative progression through trial and error to converge to the maximum can be used. Also, gradient search can be used to optimize the locator function.

In the case of three-dimensional location, the two-dimensional locator function $A(x,y)$ is extended to a three-dimensional function $A(x,y,z)$. As in the two-dimensional case, the processor optimizes the locator function to select a point x,y,z as the best estimate of the object's location in three dimensions. Again, any of several known optimization procedures, such as iterative progression through trial and error, gradient search, etc., can be used to optimize the locator function.

In one embodiment, the position location system of the invention also includes a reference station used to synchronize the system. The reference station preferably transmits a continuous tone which may be interrupted or modulated periodically to reset base station clocks. The tone is at a different frequency than the frequency of the locating signal tones transmitted by the portable unit and therefore does not interfere with the locating signal. In an alternative embodiment, global positioning satellite (GPS) receivers are used to generate synchronous clocks at the base stations.

In another embodiment of the invention, the receiver base stations need not all be at fixed locations, but some or all may be located on mobile platforms. These platforms can be terrestrial vehicles, persons using handheld receiver units, or can be helicopters or other aircraft. In such an embodiment, a particular mobile receiver may make successive measurements at multiple locations. Thus, a succession of measurements from locations which are known at the time of measurement, are used to measure locating signal phasors in the manner previously described, and then transmit these phasors over a radio link to a control station for use in the processing described in this invention. In this manner, by taking into account the known time differences between measurements, a single mobile platform, or just a few mobile platforms, moving quickly relative to any motion of remote subscriber unit, can be used to generate the previously described measurement of the locating signal phasors at multiple different locations.

The system of the invention is operable in multiple modes. In a first mode, an operator at the control station initiates the location process by transmitting a command to the portable unit. In response, the portable unit transmits the locating signal into the region to the base stations. In this mode, in one embodiment, the portable unit can include a conventional paging system receiver and the command sent by the control station can be a conventional paging signal. In another mode of operation, the position location process can be initiated at the portable unit itself. In this mode, a person carrying or wearing the portable unit can request that his/her location be determined. In one embodiment, the user presses a button on the portable unit which transmits a signal to the base stations and/or the control station to request that the process be initiated.

The system and method of the invention can be applied to existing cellular telephone systems and, in a similar manner, to existing and planned two-way messaging or paging systems. The base stations of the invention can be used to augment existing cellular telephone/paging base stations. They can be installed at cellular base station sites as additional hardware, or existing cellular base stations can be modified to accommodate the system and method of the invention. For example, existing base stations can be modified by adding additional receivers coupled to existing antennas required for the process of the invention. As installed at cellular base stations, the invention can be used to locate the portable unit or commercial pager as described above. In addition, the system and method can also be used to locate standard cellular telephones. Each cellular telephone transmission can include a period of unmodulated carrier which can be detected by the base stations of the invention to determine the position of a cellular telephone. Alternatively, the modulated cellular telephone transmission signal can be decomposed into tone components over known time intervals, and amplitudes and phases of such components can be used in the process of the invention.

The position location system and method of the invention have several advantages over prior approaches. The approach of the present invention is to receive data from plural base stations indicative of several attributes of the locating signals preferably including amplitude, phase and time information, and, using all of these attributes, to combine the data in an optimal fashion to compute location directly using an optimization procedure. In contrast, the prior systems use only a single attribute, typically phase, of the signal transmitted by the object to be located. The prior approaches compute location indirectly by some simple geometric approach such as triangulation. The use of several attributes that are indicative of object position and the direct computation of position based on all of these attributes makes the system of the present invention far more accurate than prior systems.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

Figure 1:
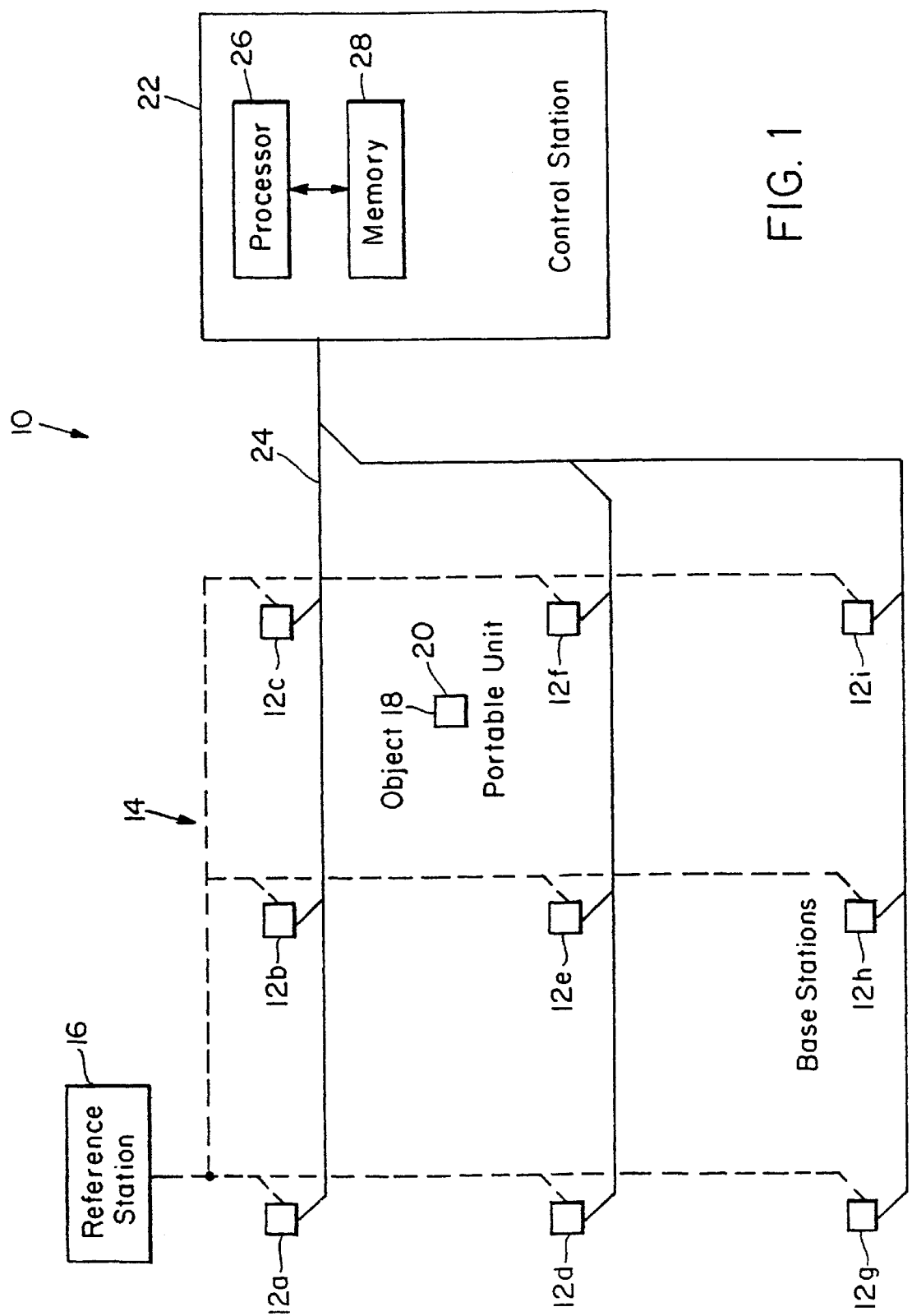
FIG. 1 is a diagram showing one preferred configuration of the position location system of the invention.

FIG. 1 is a schematic diagram of one preferred embodiment of the position location system 10 of the invention. The system 10 includes a plurality of base stations 12 labeled 12a–12i arranged in a grid in a region 14. In one preferred embodiment, adjacent base stations 12 are separated by a distance of, for example, between 0.1 and 10 miles, as in the case in which the invention is applied to a cellular telephone system. It will be understood that the system of the invention could include more or less than the nine base stations 12a–12i shown in FIG. 1 depending on the extent of the area to be covered. Only nine base stations 12 are shown in FIG. 1 to simplify the description of the invention.

An object or person 18 whose position is to be determined by the system 10 of the invention is located within the region 14 among the base stations 12. A portable unit 20 of the invention is located at the object or person 18. The portable unit 20 can be carried by the person 18, for example, as a portable pager unit would be carried, or it can be worn on the user's wrist. The portable unit can also be built into clothing, such as a belt, shoe, etc.

When the location of the object or person 18 is to be determined, the portable unit 20 transmits a locating signal in all directions into the region 14. The locating signal can be a pair of single-frequency tones transmitted one at a time in succession or simultaneously. The locating signal is received by several of the base stations 12 which generate representative signals indicative of various attributes of the locating signal as received at the base stations. The representative signal generated by each base station preferably contains information related to the amplitude and phase of each tone and time of measurement of the locating signal as it is received at that particular base station.

Preferably, the four base stations 12b, 12c, 12e and 12f surrounding the portable unit 20 and object 18 generate the representative signals and forward them via a modem over a cable network 24 to a control station 22. Alternatively, the base stations 12 can transfer the representative signals to the control station 22 via an RF link. The control station 22 receives all of the representative signals from all of the base stations 12. A processor 26 and an associated memory 28 process the representative signals as described below in detail to determine the estimated location of the object 18 and portable unit 20.

The embodiment of the system 10 shown in FIG. 1 also includes a reference station 16 which synchronizes the base stations 12 to ensure accurate timing of measurements. The reference station 16 preferably transmits a continuous tone to the base stations 12 which can be interrupted or modulated periodically to reset the clocks in the base stations 12. The tone is at a different frequency than those of the locating signal tones such that interference is avoided.

The position location system 10 of the invention implements position location in one of multiple modes. In one mode, the location process is initiated by the control station 22. A control signal or "probe" is transmitted by RF link from the control station 22 to the portable unit 20 to command the portable unit 20 to transmit the locating signals. The probe is also received by the base stations 12 to ready them to receive the locating signal from the portable unit 20.

In another mode, position location can be implemented by the person 18 at the portable unit 20. The person presses a button on the portable unit which causes a modulated alert command signal to be transmitted by RF link from the portable unit 20 to base stations 12 and/or the control station 22. The modulated alert command signal can also be modulated with information such as portable unit ID and sensor data regarding the condition of the person 18. The method of modulation may be frequency shift keying (FSK), binary phase shift keying (BPSK), quadrature phase shift keying (QPSK) or other multiple phase shift keying. When the control station 22 receives the modulated alert command from the portable unit, it generates a probe signal and transmits it back to the portable unit 20 to command the portable unit 20 to transmit the locating signals to begin position location. This return request from the control station 22 can also serve as confirmation to the user 18 at the portable unit 20 that the alert from the portable unit 20 was received by the control station 22.

Figure 2:
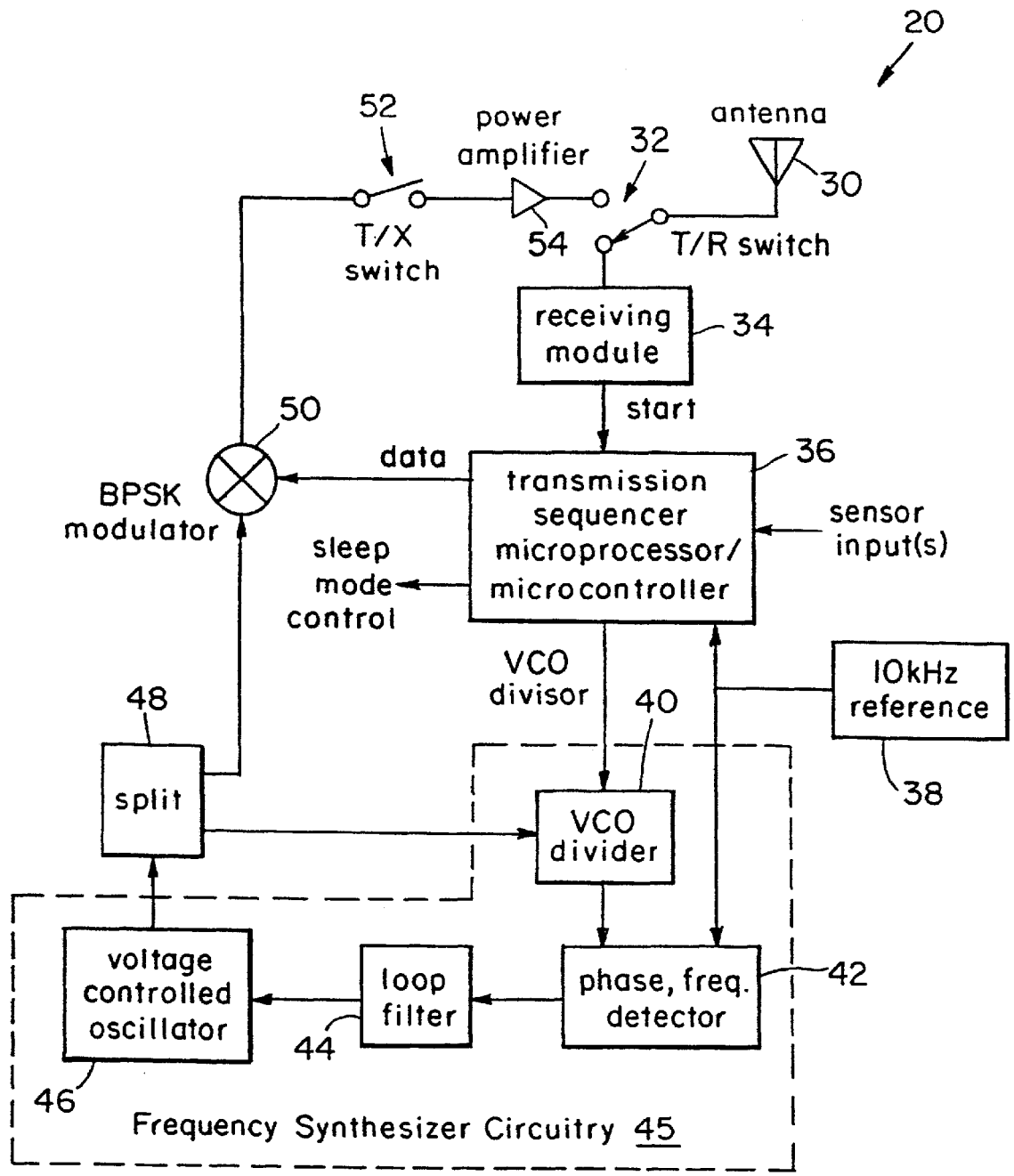
FIG. 2 is a schematic block diagram of one preferred embodiment of a portable unit in accordance with the present invention.

The individual subsystems of the position location system 10 will now be described in detail. FIG. 2 is a schematic block diagram of one embodiment of the portable unit 20 of the present invention. The portable unit 20 includes an antenna 30 coupled to a dual-position transmit/receive switch 32. In a first position as shown in the drawing, the transmit/receive switch 32 couples the antenna 30 to a receiving module 34 which receives signals from the control station 22. The receiving module 34 can be implemented in a variety of ways, including the use of a commercial pager. Alternatively, the receiving module 34 can be implemented in custom dedicated circuitry. In the case where the receiving module 34 is a commercial pager, an additional antenna for transmission is added, and the transmit/receive switch 32 is eliminated. The antenna 30 would serve as a dedicated receive antenna and would be connected directly to the receiving module 34.

When the receiving module 34 determines that a probe signal has been received, it begins the position location process by issuing a start command to a transmission sequencer microprocessor/microcontroller 36 and activating a sleep mode control signal which brings the unit out of sleep mode and into a transmit mode by changing the position of transmit/receive switch 32. The microprocessor/microcontroller 36 operates to set up transmission of the locating signals to the base stations by controlling a frequency synthesizer circuit 45. The processor/controller 36, operating from a 10 kHz reference 38, outputs a voltage controlled oscillator (VCO) divisor signal to the VCO divider 40 of the synthesizer circuitry which, in combination with the 10 kHz reference signal, generates a signal at the frequency of the first locating signal tone. The signal is passed through the phase and frequency detector 42 whose output is applied to a loop filter 44. The loop filter 44 passes a control signal to the VCO 46 to set the frequency of the VCO's output.

The VCO output is applied to the input of a splitter 48. One output of the splitter 48 is applied back to the VCO divider 40. The other output is applied to an input of a BPSK modulator 50. The modulator 50 modulates the output tone. The tone waveform is primarily designed to identify the location of the portable unit 20, but it can also be modulated by the BPSK modulator 50 to transmit any additional data that may be preprogrammed or requested, such as identification and/or status of the person or object 18 at the portable unit 20 or any sensor data which may be available at the portable unit 20. Such sensor data at the sensor inputs may include measurements reporting on the vital functions of a person being monitored, environmental data in the vicinity of the object, etc.

After the VCO divisor signal is applied by the processor/controller 36, the synthesizer circuitry 45 is allowed to settle. After the settling time, the transmit or TX switch 52 is closed or keyed down to transmit the first locating signal tone. The signal from the modulator 50 is applied through the switch 52 to a power amplifier 54. The transmit/receive switch 32 is switched to the transmit position such that the output of the power amplifier 54 is applied to the antenna 30 to transmit the first locating signal tone to the base stations.

After transmission of the first tone is completed, the processor controller 36 outputs the VCO divisor signal for the frequency of the second tone. The above process is repeated to transmit the second locating signal tone to the base stations 12. In one embodiment, the two tones are 20 kHz apart at a frequency of 100 MHz with a total transmitted power of 100 mW. In this embodiment, the timing reference signal is at a frequency at the midpoint between the frequencies of the two locating signal tones.

Figure 3:
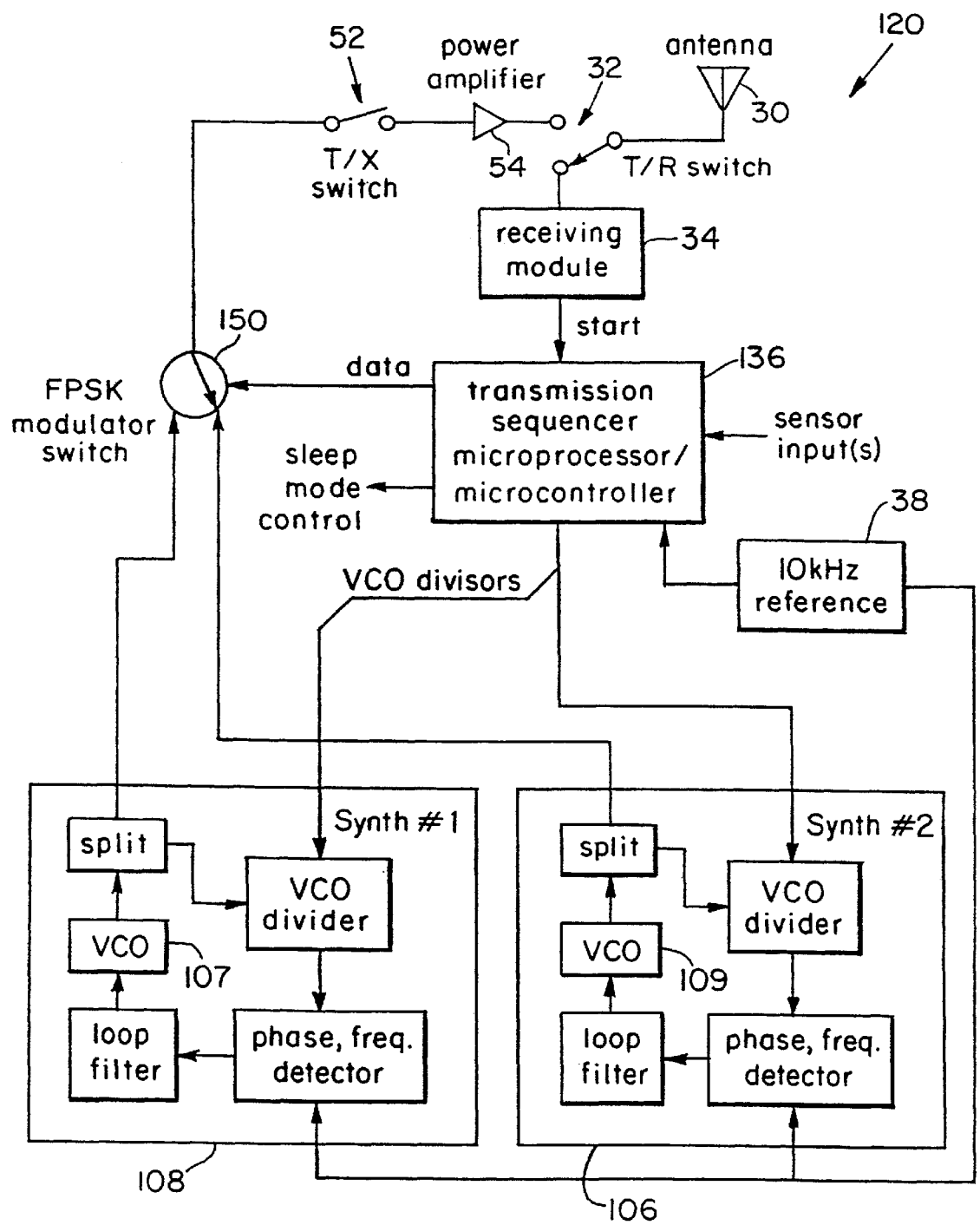
FIG. 3 is a schematic block diagram of an alternative preferred embodiment of the portable unit of the present invention.

FIG. 3 is a schematic block diagram of an alternative preferred embodiment of a portable unit 120 in accordance with the present invention. In the alternative embodiment of FIG. 3, the settling requirement of the embodiment of FIG. 2 is eliminated by the use of two frequency synthesizing circuits 106 and 108 instead of the single synthesizer circuit 45 of the embodiment of FIG. 2. In FIG. 3, the microprocessor/microcontroller 136 sends two different VCO divisors, one to each synthesizer circuit 106 and 108. The VCO 107 of circuit 108 generates the frequency of the first tone, and the VCO 109 of circuit 106 generates the second frequency tone. A switch 150 is used to select the tone signal to be forwarded to the transmission circuitry 52 and 54. In this embodiment, frequency shift keyed (FSK) modulation is used to modulate sensor data. As in the previously described embodiment, the microprocessor/microcontroller 136 controls a sleep mode of the transmission circuitry via a sleep mode control output. When the receiving module 34 indicates a probe has been received to implement position location, the sleep mode control signal becomes active to change the state of transmission circuitry from sleep mode to transmit mode.

Figure 4:
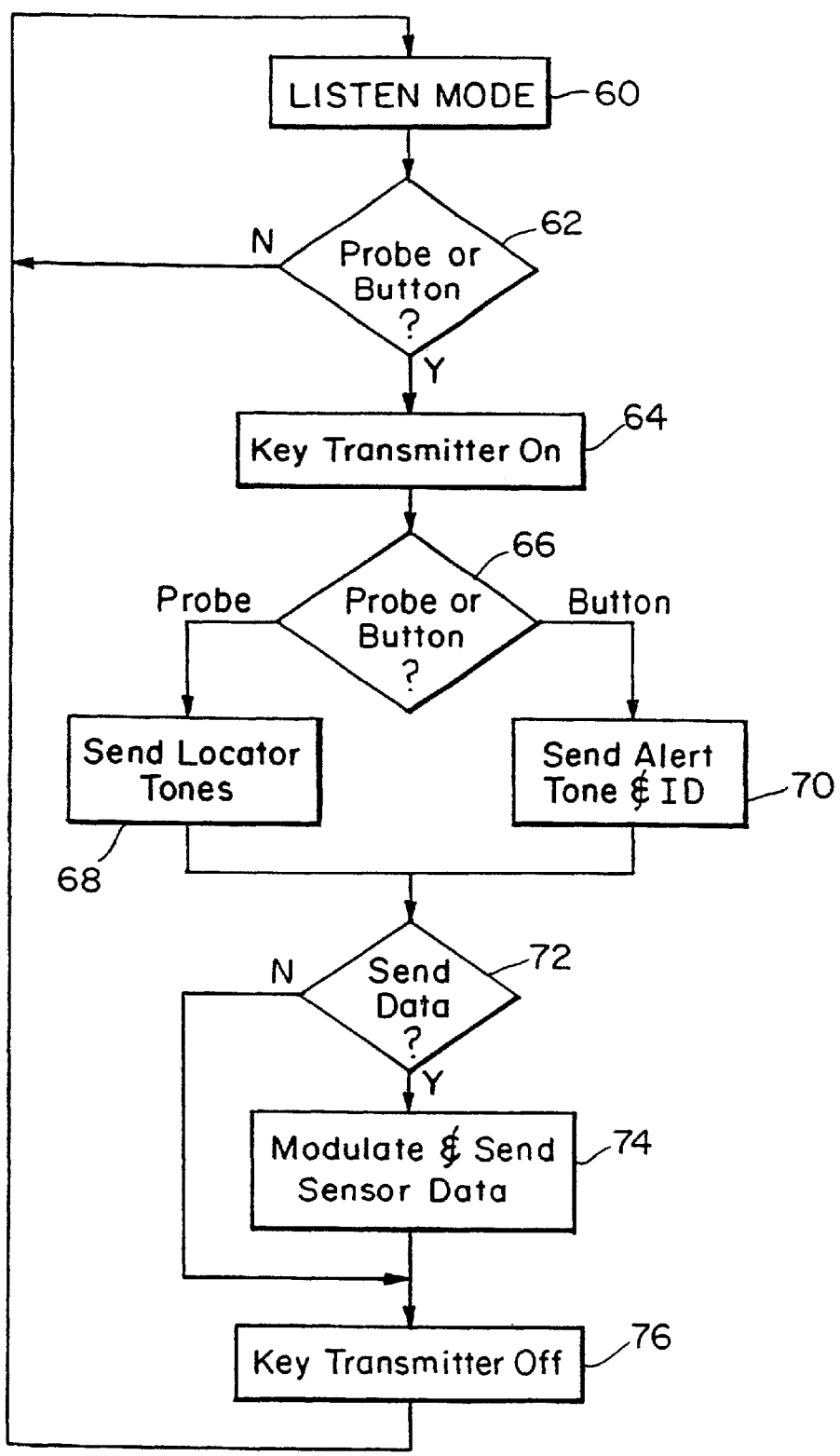
FIG. 4 is a schematic flow diagram showing the operational flow of a portable unit in accordance with the present invention.

FIG. 4 is a schematic flow diagram illustrating the operational flow of the portable unit of the present invention. As shown in step 60, before activation, the portable unit waits in listen mode to receive a command to implement the position location process. The command can come from a probe command transmitted by the control center or it can be implemented by the user by pressing a button on the portable unit.

Decision step 62 controls the listen mode. Until a probe is received or a button is pressed, the portable unit stays in listen mode. When a probe is received or a button is pressed, flow travels along the "Y" (yes) branch out of decision step 62 to step 64. In step 64, the transmitter is keyed on. Depending upon the decision in step 66, either the locator tones are transmitted or an alert tone with object identification are transmitted by the portable unit. As shown in step 68, if probe was received, then the locator signal tones are transmitted to the base stations. On the other hand, if the user pressed a button to implement position location, then, as shown in step 70, an alert tone with user ID is transmitted to the base stations. As shown in decision step 72 and step 74, if data is available for relaying to the control station, then the signal is modulated with sensor data. If no data is available, then the signal is transmitted without data modulation. After the signals are transmitted, as shown in step 76, the transmitter is keyed off, and the portable unit returns to the listen mode in step 60.

Figure 5:
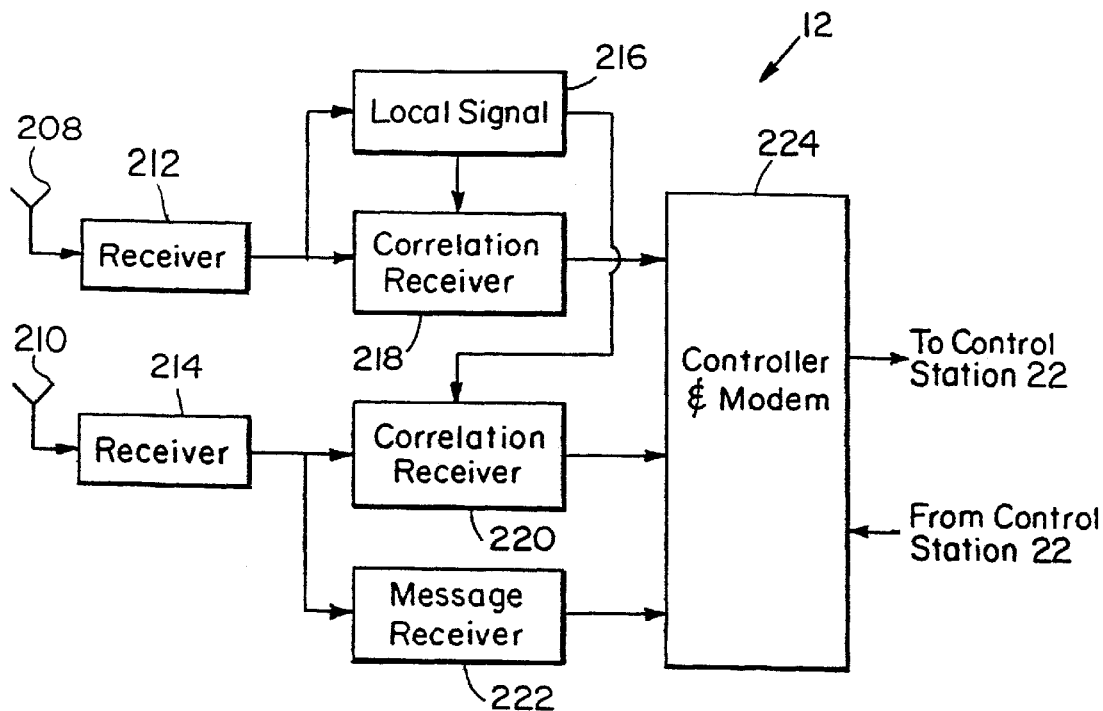
FIG. 5 is a top-level schematic block diagram of one preferred embodiment of a base station in accordance with the present invention.

FIG. 5 is a schematic top-level block diagram of one embodiment of a base station 12 in accordance with the present invention. As described above, each base station 12 is capable of receiving the signals from the portable unit 20 as well as from the reference station 16 (see FIG. 1). Each base station 12 includes at least one antenna 208. If two antennas 208 and 210 are optionally used, they are spaced from each other by a distance between a quarter wavelength and several wavelengths. Optionally, another antenna vertically above or below the antennas 208, 210 also spaced by a distance of between a quarter wavelength and several wavelengths can be used where elevation is also being estimated.

The antenna 208 is able to receive signals from any orientation of a linearly polarized transmit antenna 30 of a portable unit 20. Accordingly, the polarization of the base station antenna 208 may be circular, resulting in a 3 dB loss, but capable of receiving any linear polarization. Alternatively, either dual polarization receivers may be used at the base stations 12, or different polarizations can be used at different base stations 12.

Each antenna 208 and/or 210 is coupled to a receiver 212 and/or 214, respectively. If necessary, at least one of the receivers 212 or 214 separates the timing synchronization tone transmitted by the reference station 16 from the locating tones transmitted by the portable unit 20.

The base station 12 also includes a local signal generator 216 which locks onto the received reference station signal or to a GPS signal and generates two internal base station tones at the same nominal frequencies as the locating tones transmitted by the portable unit 20. The signal generator 216 also supplies a local clock which counts cycles of the reference station 16 or GPS tone since the last reset. This assures that all base station clocks can be synchronized to the same time referenced to the control station 22.

The base stations also include at least one correlation receiver 218 and/or 220, each of which is coupled to a receiver 212, 214, respectively. Each correlation receiver 218, 220 measures the phase and amplitude of the two tones received from a portable unit 20 relative to the corresponding two base station tones generated by the local signal generator 216.

The outputs from the correlation receiver 218 are complex phasors optionally offset in time and frequency as discussed below. Such outputs may be provided in one of at least two ways. The first is by taking the offset measurement at a prearranged time coordinated by the control station 22, so that all base stations 12 take a measurement at the same time. The other is to take autonomous measurements which can be done whenever the correlation receiver 218 detects the two locating tones from the portable unit as sufficiently high receive levels. In this second case, the correlation receiver 218, 220 records the time of the measurement and also measures any frequency difference between the tones received from the portable units and the tones generated by the local signal generator 216.

A message receiver 222 in the base station 12 can receive the two or more modulated locating tones from the portable unit as described above. The method and modulation can be frequency shift keying (FSK) or, if higher data rates are desired, phase shift keying. A message transmitted by a portable unit 20 may precede or follow its position locating tones. For user-generated alerts however, a modulated alert command may be received by a base station 12 at any time. Such a message is relayed to the control station 22 which then initiates a request for a normal position location transmission from the portable unit 20.

The outputs of the correlation receivers 218 and/or 220 and the message receiver 222 are applied to a controller and modem 224. The controller formats message and signal data for transmission to the control station 22. In one preferred embodiment, the formatted data is transmitted by a standard telephone modem. Alternatively, a dedicated RF link can be used. The controller and modem 224 also serves the function of receiving at the base station 12 control and timing data such as time and identity of the probes from the control station 22.

In another embodiment of the invention, the receiver base stations 12 need not all be at fixed locations, but some or all may be located on mobile platforms. These platforms can be terrestrial vehicles, persons using handheld receiver units, or can be helicopters or other aircraft. In such an embodiment, a particular mobile receiver may make successive measurements at multiple locations. Thus, a succession of measurements from locations which are known at the time of measurement, are used to measure locating signal phasors in the manner previously described, and then transmit these phasors over a radio link to a control station for use in the processing described in this invention. In this manner, by taking into account the known time differences between measurements, a single mobile platform, or just a few mobile platforms, moving quickly relative to any motion of remote subscriber unit, can be used to generate the previously described measurement of the locating signal phasors at multiple different locations.

Figure 6:
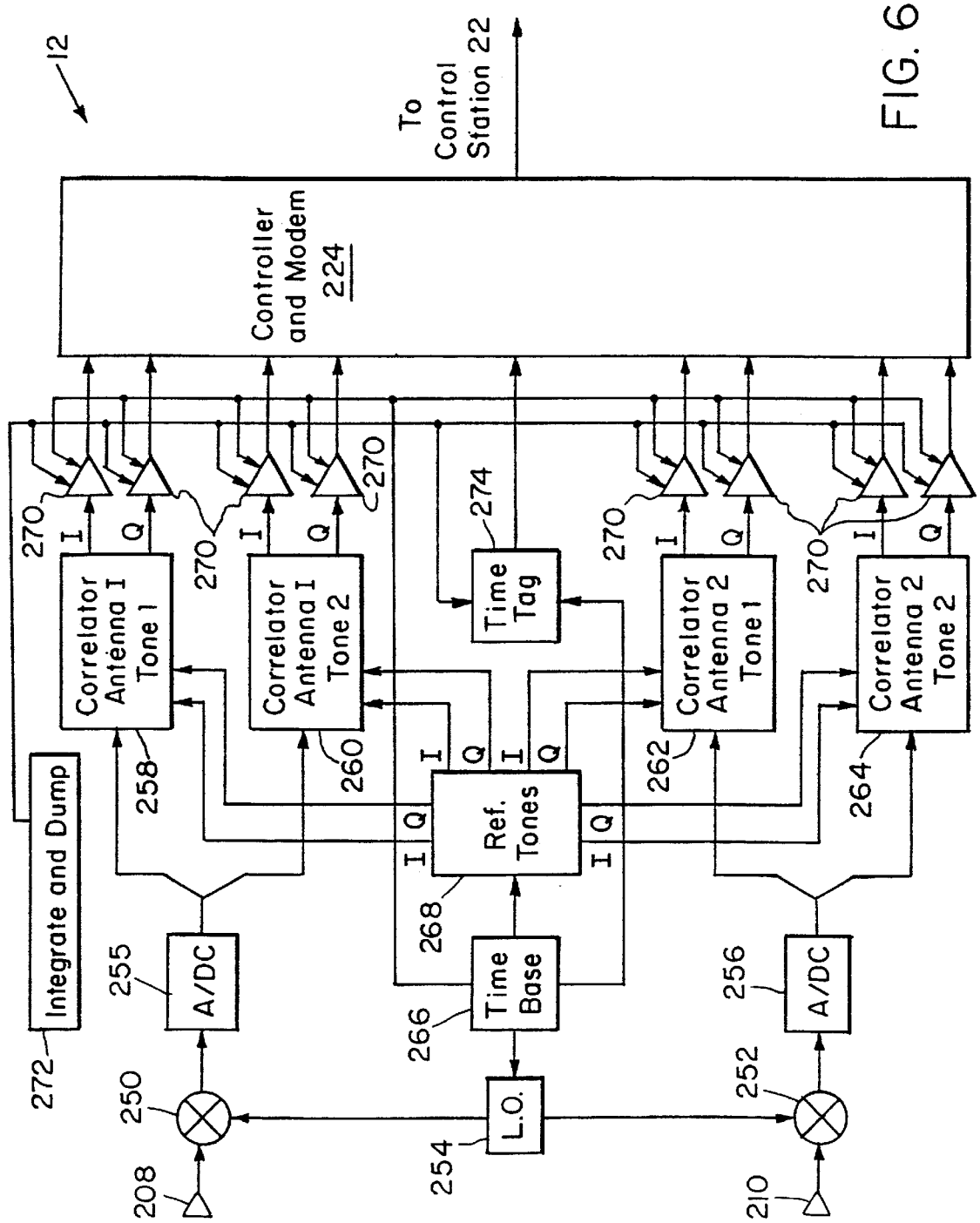
FIG. 6 is a detailed schematic block diagram of one preferred embodiment of a base station in accordance with the present invention.

FIG. 6 is a detailed schematic block diagram which shows details of the base station 12 of the present invention not shown in the top-level block diagram of FIG. 5. For purposes of the description, it is assumed that two single-frequency tones are transmitted in succession from the portable unit 20. The frequencies of the first and second tones are 100.01 MHz and 100.03 MHz, respectively. The first tone is transmitted for 100 msec and then, following a wait period of 50 msec, the second tone is transmitted for 100 msec.

The received signals at antennas 208 and 210 are applied to down converters 250 and 252, respectively. The local oscillator 254 applies a 100 MHz signal to each down converter such that when the antennas 208, 210 receive the first tone, the down converters 250 and 252 output a 10 kHz tone, and when the antennas 208, 210 receive the second tone, the down converters 250, 252 output a 30 kHz tone. The tones are digitized at A/D converters 255 and 256.

The digitized tone data is applied to correlators 258, 260, 262 and 264. As described above in connection with FIG. 5, the correlators form a portion of the correlation receiver 218, 220 for each receiver channel in the base station 12. The correlators 258, 260, 262, 264 operate synchronously at all base stations 12. Synchronization can be obtained through the transmission of a reference signal by the reference station 16 (see FIG. 1), or the use of several other available sources including GPS-based time references. This time synchronization is indicated by the time base 266 in FIG. 6. The time base 266 provides a timing signal to a reference tone generator 268 which generates the reference tones applied with the received tones to the correlators. The correlated waveforms at the output of the correlators are complex waveforms which are synchronized with the time reference. The reference tones are stored or generated digitally.

In the absence of frequency offsets, the correlators can estimate the phase and magnitude of the signals by integrating the correlator output over a fixed period of time, nominally the full 100 msec. In order to obtain the best phase estimates, the 100-msec integration should slide to obtain the best alignment with the incoming signal. This is preferably done by resetting the integrators 270 frequently, for example, at a 10 μsec interval while a running sum of correlator output values is kept in the computer. By summing the sequential correlator outputs over different time intervals, the waveform magnitude and phase of the signal during the interval in which the peak was generated can be obtained from the I and Q values.

The timing of the integrators 270 is provided by an integrate and dump timing circuit 272 which provides control signals to the integrators 270. The integrate and dump circuitry 272 also provides a control signal to time tag circuitry 274. The time tag circuitry 274 forwards time data from the time base 266 to the computer as signal I and Q data is dumped to the controller and modem 224. The time tag is forwarded to the control station 22 along with the pertinent integrator data to identify the time particular signal data was received and is used in subsequent position location calculations.

Because the integration process is carried out over a significant period of time, frequency offsets should be taken into account. Conventional techniques, such as adjusting a local oscillator using information derived from the incoming signal, are to be avoided, since the signal-to-noise ratio may be poor, and it is desirable to minimize the duration of the transmission and to minimize repeat transmissions.

One solution to this is to provide a bank of correlators, each at a slightly different frequency, or to sample the correlator output at a high rate and subject the sampled output to Fourier analysis. The number of correlators in the bank or the rate at which the correlator output is to be sampled is determined by (1) the maximum frequency offset, which is dominated by motion and the stability of portable unit crystal, and (2) the required integration period. In the 100 MHz case, frequency offsets due to crystal tolerance, aging and temperature effects can be as high as ±2,000 Hz. If the correlator is applying a 10 kHz reference tone, then the output of the correlators would be quadrature tones anywhere from DC to 2000 Hz, instead of simply DC values. In order to extract the needed information without knowledge of the frequency offset or time of arrival of the signal, the correlator output needs to be sampled at least at the Nyquist rate, i.e., 4,000 Hz.

Figure 7:
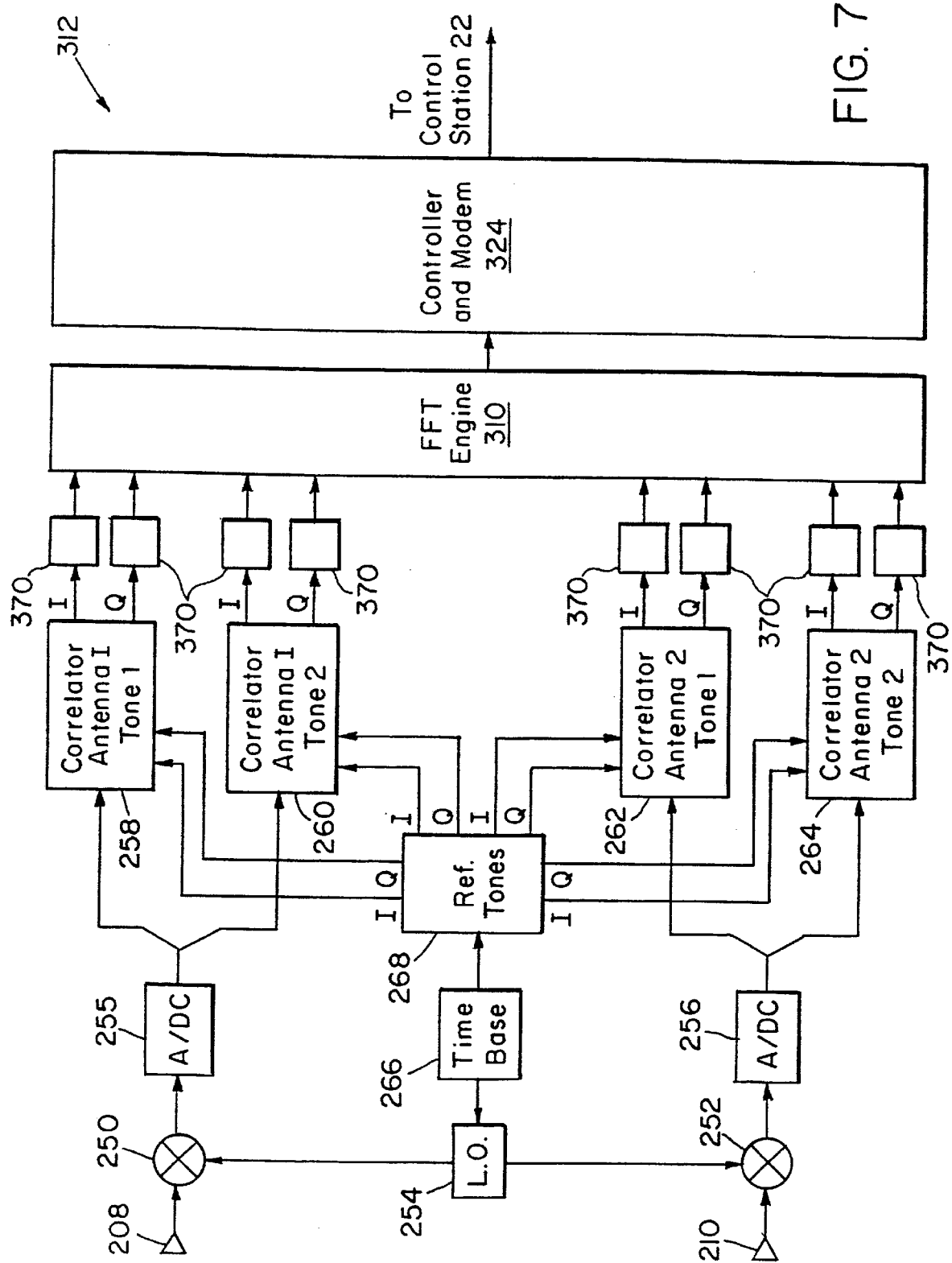
FIG. 7 is a detailed schematic block diagram of an alternative preferred embodiment of a base station in accordance with the present invention.

This requirement leads to the implementation of FIG. 7. The embodiment depicted in FIG. 7 is a variation on that shown in FIG. 6. In the embodiment of FIG. 7, each of the I and Q correlator outputs is applied to a low pass filter 370 whose outputs are then fed to an FFT engine 310. If the signal is sampled at 10 kHz and 100-point transforms are executed, the window of integration in the FFT is 10 msec, so ten successive FFTs would span the received tone. To reduce the small potential degradation in this process, which is due to non-optimal use of the signal energy, overlapped FFTs could be used.

There are other options which can be used to process the digitized samples, including other transform types. Also, the correlators can be eliminated altogether, and all processing can then be done in the FFT. Due to the low sample rates, it is possible to make multiple passes with the sampled data in real time.

Figure 8:
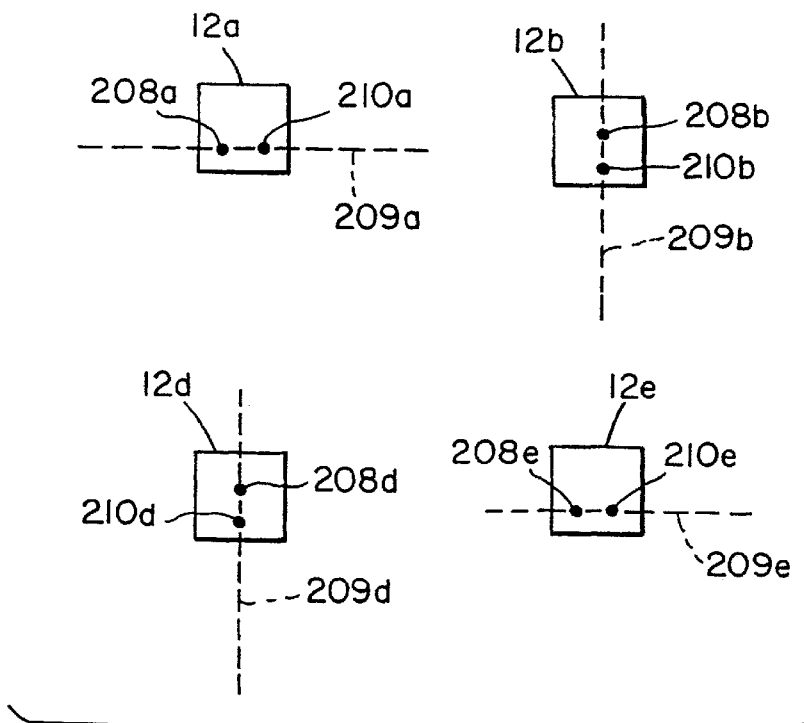
FIG. 8 is a schematic diagram depicting one preferred orientation of pairs of antennas located at four base stations used in the position location system of the invention.

FIG. 8 is a schematic diagram illustrating four base stations 12a, 12b, 12d and 12e arranged in the preferred square configuration. The diagram illustrates one method of orienting the base stations 12 with respect to each other such that the antennas 208, 210 on each base station is are oriented relative to each other to optimize the accuracy of the position location process of the invention. Each pair of antennas 208, 210 on a particular base station 12 defines an antenna axis 209 which extends through the center of both antennas 208, 210. In the preferred configuration shown in FIG. 8, the antenna axes of horizontally or vertically adjacent base stations 12 are orthogonal to each other. This improves the ability of the antennas 208, 210, their associated receivers and other circuitry to accurately determine the direction to the portable unit 20.

Figure 9:
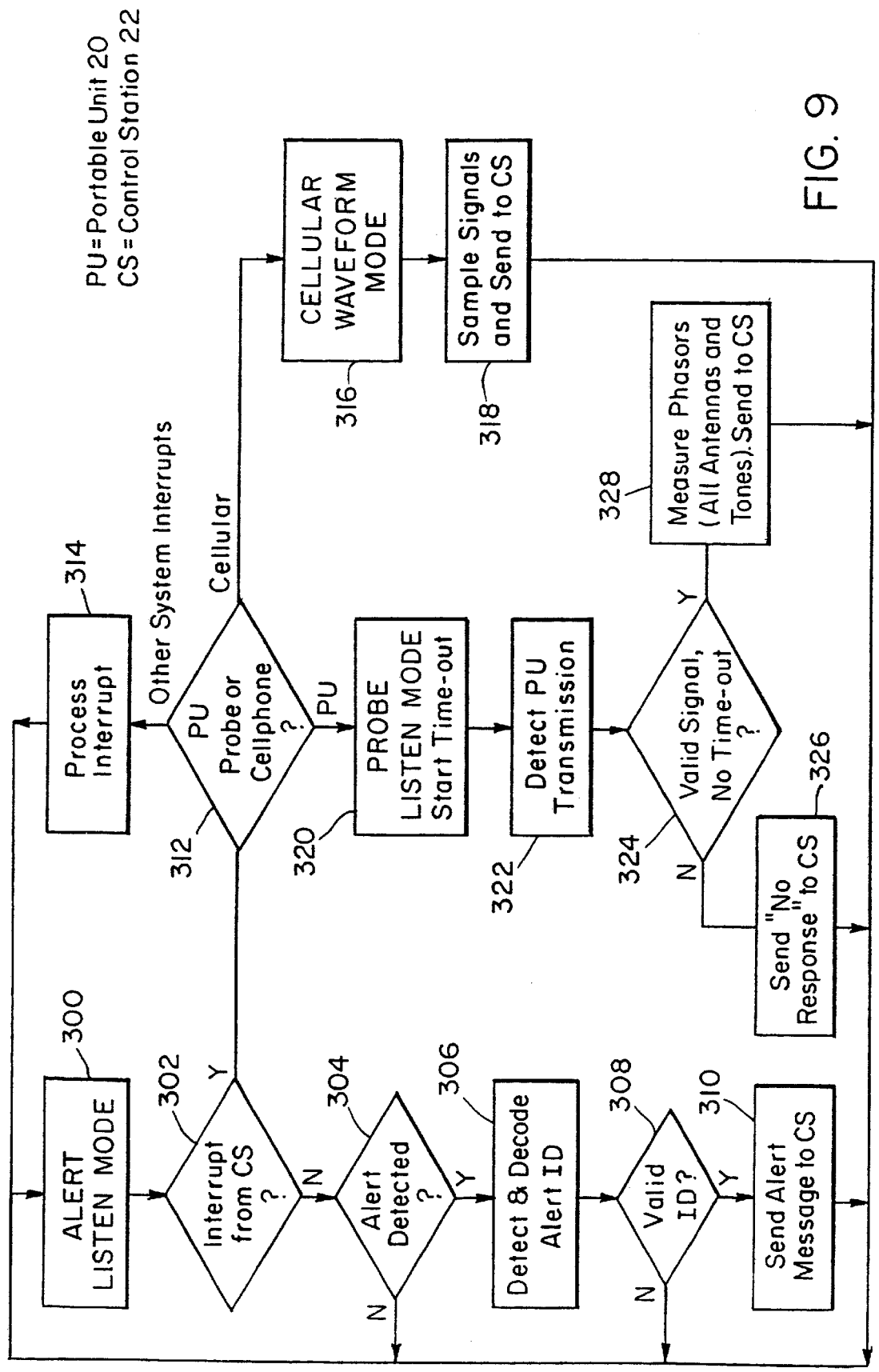
FIG. 9 is a schematic flow diagram illustrating the operational flow of a base station in accordance with the present invention.

FIG. 9 is a schematic flow diagram illustrating the operational flow of a base station in accordance with the present invention. As shown in step 300, the base station normally operates in an alert listen mode in which it waits for an interrupt from the control station 22. As shown in the "N" (no) branch of decision step 302, the flow waits for the interrupt from the control station 22. At the same time, the base station is also waiting for a user-implemented alert in which the user presses a button on a portable unit 20 to implement the position location process. If neither an interrupt from the control station nor an alert from the user is received, then the base station waits in the alert listen mode. If an alert is detected, the flow proceeds to step 306 in which the alert signal transmitted by the portable unit 20 is detected and decoded to determine the ID of the portable unit 20. In decision step 308, the ID is examined to determine if it is valid. If it is not, flow returns to the alert listen mode at step 300. If the ID is valid, an alert message is sent to the control station 22 in step 310 and flow then returns to the alert listen mode to wait for the control station 22 to initiate the position location process.

When an interrupt is received from the control station 22, flow continues to decision step 312 where it is determined what type of interrupt was issued. If a system interrupt such as a maintenance/calibration request was issued, the request is processed in step 314, and flow returns to the alert listen mode at step 300. If a cellular system location request was made, the base station enters cellular waveform mode at step 316. In step 318, the base station samples signals from the cellular device that is to be located and sends sampled data to the control station 22. Flow then returns to the alert listen mode at step 300 while the control station performs the position location process.

If the determination made in step 312 is that a portable unit is to be located, the base station enters a probe listen mode in step 320. Upon entering the probe listen mode, the base station starts a specified prescribed time-out period. If a portable unit transmission is detected in step 322, it is examined in decision step 324 to determine if it is a valid signal before the time-out period has expired. If not, a "no response" signal is transferred to the control station at step 326, and flow returns to the alert listen mode at step 300. If a valid signal is received from a portable unit within the time-out period, the phasor data at all antennas is measured, and the signal data is sent to the control station 22 at step 328. Flow then returns once again to the alert listen mode in step 300.

Figure 10:
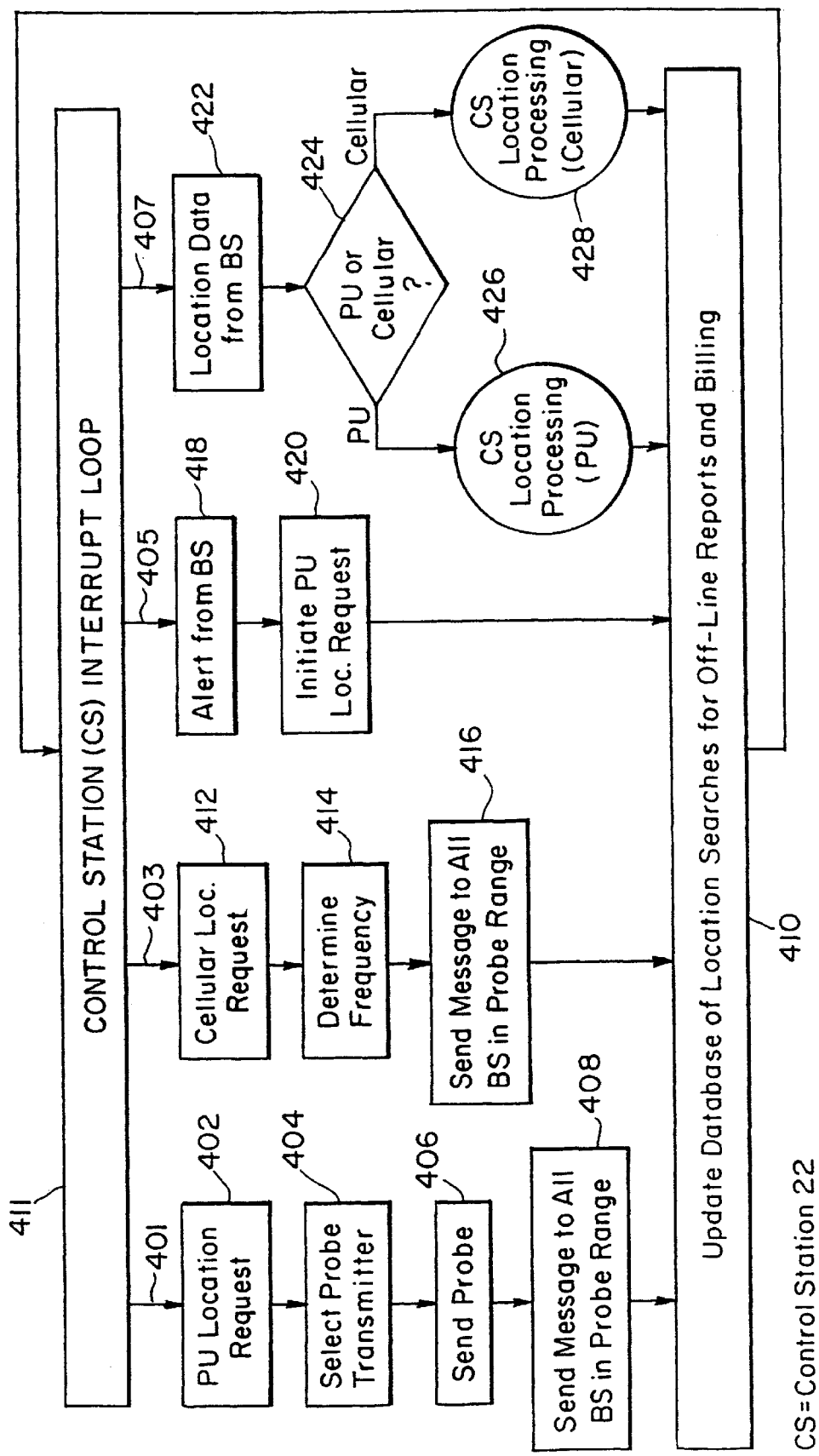
FIG. 10 is a schematic flow diagram illustrating the operational flow of a control station in accordance with the present invention.

FIG. 10 is a schematic flow diagram of the operational flow of the control station 22 in accordance with the present invention. The control station 22 is capable of receiving the outputs of the base station correlation and message receivers via each base station's controller and modem through its connection to an appropriate local network or through an RF link. The outputs of the base station are used at the control station 22 to compute the estimated location of the portable unit 20. The control station 22 also initiates requests for a particular portable unit 20 to transmit its locating tones. The control station 22 also accepts requests from users carrying specific portable units 20 to locate themselves or such requests from groups of portable units 20. The control station 22 can also tell the appropriate base station when, and on what channel, to look for a cellular transmission. The control station 22 can also initiate search procedures to locate objects in the field, as appropriate for the application. The control station 22 in one grid block or geographic area can also be capable of communicating with other control stations serving other grid locks or geographic areas and in other networks of base stations, thus being capable of coordinating wide area searches.

FIG. 10 is a top-level flow diagram illustrating the flow of the control station interrupt loop in accordance with one embodiment of the invention. The loop is entered through one of four branches 401, 403, 405, 407, depending upon how the interrupt was initiated. If a portable unit location request was received as indicated at step 402, branch 401 is entered. A control station transmitter is selected to transmit the probe command in step 404, and the probe is transmitted in step 406. Finally, in step 408, a message is transmitted to all base stations within the probe range informing them that a probe has been transmitted. In one preferred embodiment, the control station 22 generates and maintains a database of location searches in order to provide data for off-line reports and billing. In step 410, the database is updated to include the current search, and flow returns to the top of the interrupt loop at box 411.

If a cellular location request is implemented as shown in box 412, the flow enters through branch 403. The cellular frequency is determined at step 414 and in step 416, a message is sent to all base stations in the probe range.

If an alert is relayed by a base station from a portable unit as shown in step 418, flow enters the interrupt on branch 405. A portable unit location request is initiated at step 420. The database of location searches is updated in step 410, and the flow then continues to step 402 where a normal portable unit location request is implemented.

Branch 407 of the interrupt loop is entered when the control station 22 receives location data from the base stations as indicated in step 422. As shown in decision step 424, if portable unit data is received, then the control station performs portable unit location processing as indicated at step 426. If cellular data is received from the base stations, then cellular processing is performed as indicated at step 428. Once again, after the processing is complete, at step 410, the location search database is updated, and flow returns to the top of the interrupt loop at step 411.

Figure 11:
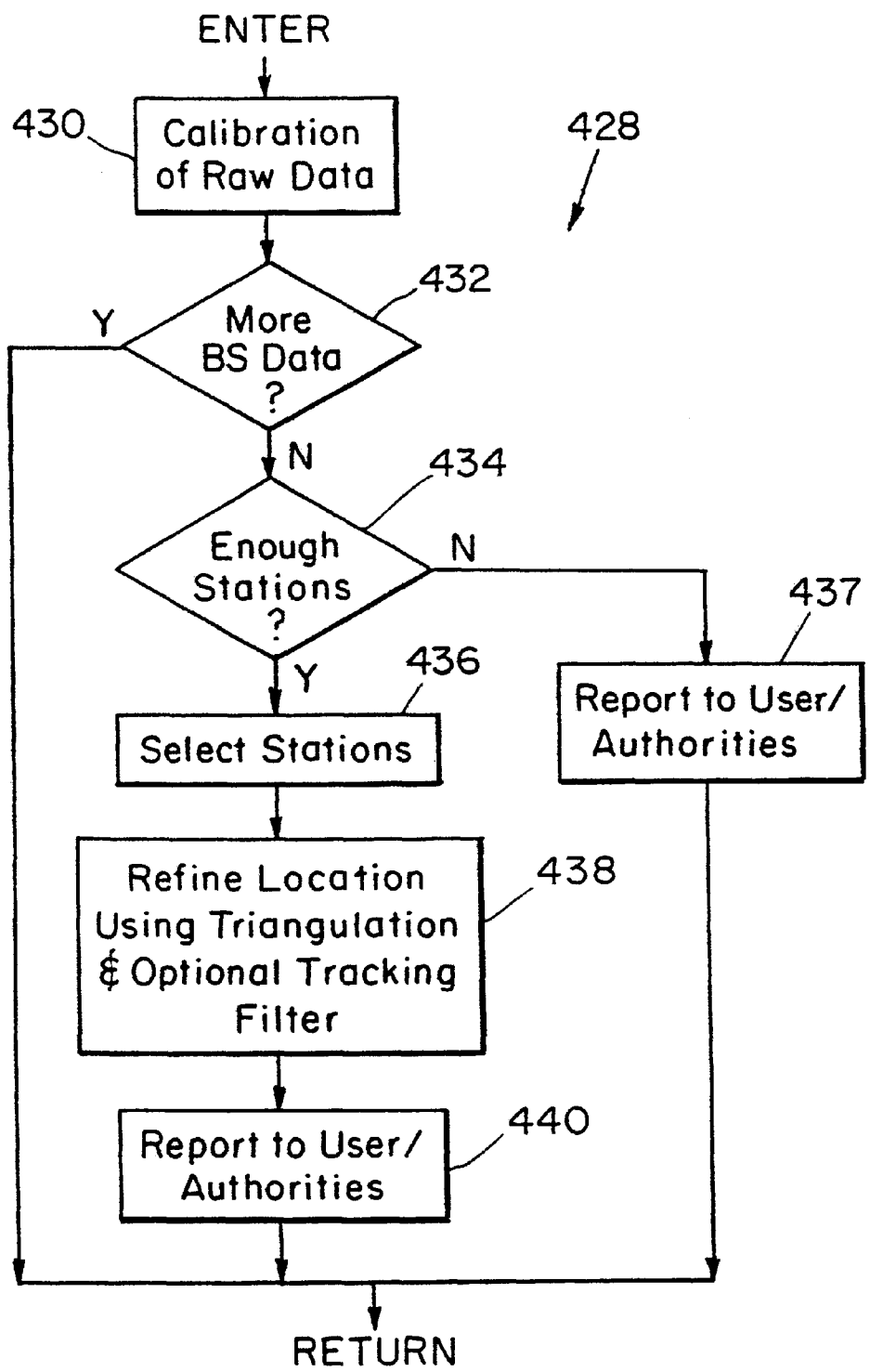
FIG. 11 is a schematic flow diagram illustrating the operational flow of the control station location processing for cellular applications.

FIG. 11 is a flow diagram showing the steps of cellular unit processing indicated in step 428 of FIG. 10. Upon entering the processing procedure 428, raw data is calibrated at step 430. At decision step 432, the process determines whether more base station data is to be received. If so, the flow returns to the main control station interrupt loop shown in FIG. 10 to await more base station data. If all of the data has been received, then flow passes to decision step 434 in which it is determined whether enough base stations have reported data to permit a position location determination. If not, a report is made to the user or authorities in step 437, and flow returns to the main interrupt loop. If enough stations have reported, then the stations whose data is to be used in the position location determination are selected in step 436. The location is computed in step 438 using triangulation. An optional tracking filter to refine the location computation can also be used. In step 440, the location is reported to the user and/or authorities, and flow then returns to the main interrupt loop depicted in FIG. 10.

Figure 12:
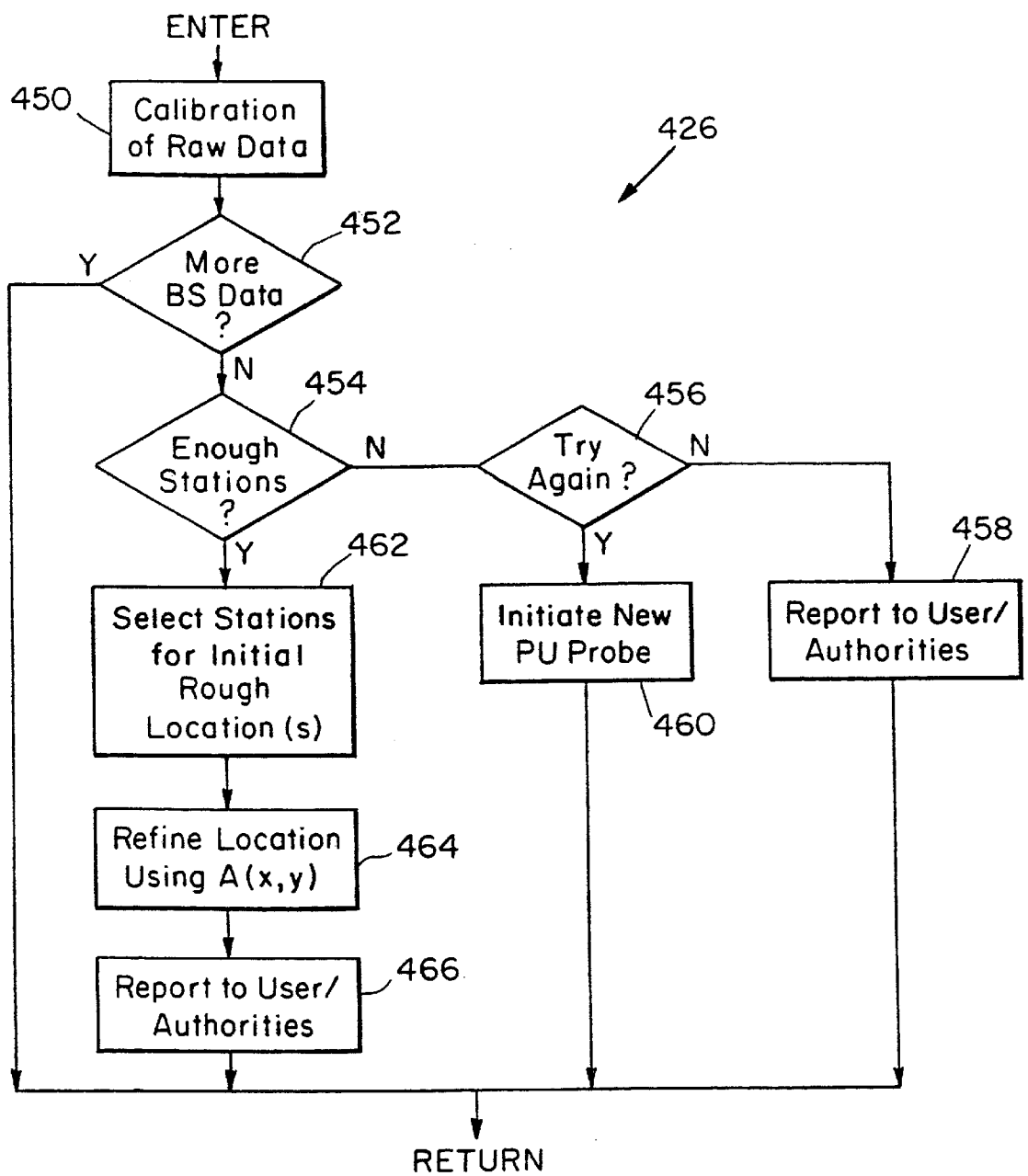
FIG. 12 is a schematic flow diagram illustrating the operational flow of the control station location processing for locating a portable unit in accordance with the present invention.

FIG. 12 is a flow diagram showing the details of portable unit processing indicated in step 426 of FIG. 10.

At the beginning of portable unit processing, raw data from the base stations is calibrated in step 450. Next, in decision step 452, the process determines whether more base station data is to be received. If so, flow returns to the main interrupt loop to await the additional base station data. If no more base station data is expected, then flow proceeds to decision step 454 where a determination is made as to whether enough base stations have reported data to permit a position location determination to be made. If not, flow proceeds to decision step 456 where it is decided whether to initiate another attempt at position location. If not, a report is made to the user and/or authorities at step 458, and flow then returns to the main interrupt loop. If it is decided to try again, then a new portable unit probe signal is issued in step 460, and flow once again returns to the main interrupt loop to wait for base station data.

If the decision in step 454 is that enough base stations have reported data, then the stations used for the position location determination are selected in step 462. The initial rough location estimate has been determined in step 462. Next, in step 464, the location of the portable unit is computed directly using the locator function A(x,y) (in the case of two-dimensional position location) as described below in detail. In step 466, the location is reported to the user and/or authorities, and flow then returns to the main interrupt loop.

As described above, in step 464 of the portable unit processing flow shown in FIG. 12, the location of the object 18 and portable unit 20 is computed directly from base station data using a two-dimensional locator function A(x,y). That computation will now be described in detail. More particularly, receivers receive transmissions composed of tones from the transmitting remote unit, and select certain segments of one or more of the transmitted tones to determine their respective amplitudes and phases, together called phasors. The phasors are measured by correlation with local synchronous reference tones, having the same frequency at all base stations. When the received tones are shifted in frequency, due to oscillator offsets or Doppler shifts, the resulting frequency deviation can also be measured. The phasors, the frequency deviation, and time of measurement, along with other measured values deemed necessary for other purposes such as calibration and identification, are then forwarded to a central processor.

The central processor operates on a subset (or all) of the measured values received from the base stations to estimate location. The processor uses a two step algorithm where in Step 1 the measured values received from the base stations surrounding the region are used to define a function, called the locator function, which has location coordinates as arguments. The locator function is selected to have the following key properties:

1. It depends on both amplitude and phase measurements from all base stations, antennas, and tones being used. Specifically, the coordinates of the maximum of the locator function depends on amplitude and phase of the received phasors.
2. It does not rely on knowledge of the transmitted power.
3. It has at least one local maximum near the actual location.
4. Generally, but particularly in the absence of multipath, the local maximum will be closer to the actual location when the signal to noise ratio is higher.
5. There may be several local maxima (ambiguous peaks). However, there will usually be a unique global maximum within a given region when a sufficient number of base stations, antenna element, or tones are used. As an example, for three single-antenna base stations, and two tones transmitted from within the triangular region formed by the base stations, the function will generally have a single peak within that region when the tones are closely spaced.

6. Motion of the transmitting unit and the frequency offset caused by an imprecise local oscillator can be estimated as a by-product of the process generating the function. One way is to ignore motion and estimate the constant frequency offset of the transmitting unit by averaging the frequency deviations measured at each base station. Another way is to estimate frequency offset and motion independently and use the resulting estimates to adjust the locator function. A third way is to, at the outset, define a locator function that depends on motion and frequency offset in addition to location.

In Step 2, the processor searches for the maximum of the locator function by computing the function value at points selected by the particular search algorithm. Such algorithms are well known. This search may be aided by a priori knowledge to help speed up the search or to resolve any ambiguities that may remain. This search yields the estimated location, to compute the position of the object directly, without the need for projecting lines at angles of arrival or computing the intersection of hyperbolas defined by pairs of base stations.

When the control station 22 receives the complex phasors indicative of the locating tone antenna signals from the base stations, it computes the position of the portable unit 20. In the preferred version of the present invention, the estimated position of the object is derived by selecting as the locator function to maximize that function which will minimize the joint probability of error with respect to all the measurements. We also assume that errors are induced by Gaussian noise at each receiver.

Throughout the following we will use the index k for the base station number, m for the antenna element number, and n for the tone number. In all cases described here m=1.

A preferred embodiment of this application operates for the case of K base stations with a single antenna each, and each receiving N=2 tones from a remote transmitting unit with no Doppler frequency deviations is described first. The method consists of combining the amplitude and phase of the received complex phasors $r_{kmn}$ by forming the following function of location:

$$Z = \sum_{k=1}^{K} \{r_{k11}\dot{r}_{k12}\exp(j(\omega_2 - \omega_1)\tau_{k1})\} \quad (1)$$

where in the two-dimensional case, $Z=Z(x,y)$, and in the three-dimensional case, $Z=Z(x,y,z)$. In this implementation the function does not depend on any frequency offset. If different frequency offsets are measured at each base station, an average frequency may be used, and the received phasors appropriately adjusted. Such an embodiment assumes that Doppler effects can be ignored (in essence, assuming that the transmitter unit is not moving significantly). As in the referenced patent application, the complex phasors $r_{kmn}$ and their complex conjugates $\dot{r}_{kmn}$, are measured, by correlation with reference tones synchronized among base stations, and communicated to a central processor, where they are entered into (1) to form the locator function Z The values of this function depends on the assumed location, for instance (x,y,z), through the delays $\tau_{km}$, the travel time of the trans mitted signal between point (x,y,z) and antenna number m at base station number k. These delays are given by $$\tau_{km} = \sqrt{[(x_{km} - x)^2 + (y_{km} - y)^2 + (z_{km} - z)^2]}\Big/c, \, m = 1. \quad (2)$$

The properties of the location function (1) can be verified by adopting the following model for the received phasors:

$$r_{kmn} = \alpha_{kmn} \exp[j\omega_n(\tau_{kmS} + t_0)] + \eta_{kmn} \quad (3)$$

where $t_0$ is the time of transmission, $n\eta_{kmn}$ is the complex additive noise, $\alpha_{kmn}$ represents the received amplitude and an unknown phase, and $\tau_{kmS}$ the delay from the location of the transmitting signal source.

In order to assure that all base stations receive approximately the same waveform, even when conditions may be changing, the interval of duration T, during which the values of the phasors, $r_{kmn}$ and $\dot{r}_{kmn}$ are determined, has to be approximately the same at all antennas. T has to be long compared to propagation delays from the actual transmitting unit to the base stations.

A preferred implementation uses reference tones synchronized among base stations, for instance from voltage controlled oscillators locked to a common received signal, or locked to a local generated clock which is synchronous among base stations, such as clock from a Global Positioning System (GPS) receiver. Any phase shifts between clocks, or differences in cable lengths, can easily be calibrated out and eliminated by taking phasor measurements on signals from a source at a known location.

In an alternate implementation, the complex phasors are found by correlation with local tone references that are not fully coherent. In that case, the exact time stamps and local tone reference phases must also be known for each base station.

Measurement errors can be calibrated out, for instance by suitably adjusting the received phasors and frequencies. Calibration may be accomplished by applying suitable calibration factors to the received complex phasors. In general, the calibration factors will themselves be complex numbers. The objective of these calibration factors is to compensate for unknown delay and phase shift that the signal may incur at the base stations. The calibration factors can be derived, for example, by examining what phasors should have been received from a transmission from a known location. After such correction factors are determined, they can be applied to adjust the measured phasor values used to define the locator function.

Step 2 is to estimate the location of the transmitter by determining the coordinates of the maximum value of the function $|Z|$ of equation (1). There are several iterative methods for finding the maximum, without calculating the function at all points in the region, as described above.

In the three-dimensional case, the rage of values of the elevation coordinate z, or even the actual value of z, is generally known, as in the case of open terrain, so that the three-dimensional search for the maximum often will not require many more computations than in the two-dimensional case.

A more general case relates to an instance of multiple tones and unknown frequency deviations. It is known that any time limited waveform can be expanded into a Fourier-series, and thus be represented by a multiple-tone waveform. The general case is of a signal composed of tones that are not equally spaced. We illustrate this more general case next, limiting our discussion to the case of a single antenna at each base station. In view of the referenced patent the multiple antenna case will be obvious to people skilled in the art.

Correlation receivers at the antenna (#1) yield the complex vectors at the k-th base station and for the n-th tone that can be modeled by $$r_{kln} = \alpha_k s_n \exp[j\omega_n(\tau_{klS}+t_{0S})] \cdot \exp[j\omega_d(k)t] \cdot \exp[jit] + \eta_{kln} \quad (4)$$

in which the path attenuation and an unknown phase shift are represented by the complex factor $\alpha_k$, power and phase shift are represented by $S_n$. The delay from the transmitting unit, at the actual source coordinates $(x_S, y_S, z_S)$ to the antenna at base station k, is given by $$\tau_{klS} = \sqrt{[(x_k - x_S)^2 + (y_k - y_S)^2 + (z_k - z_S)^2]} \bigg/ c, \quad (5)$$

the noise power is given by $$\overline{|\eta_{kln}|^2} = \sigma^2 = 2N_0/T_1, \quad (6)$$

and c is the speed of light. In the above preferred embodiment, we have made explicit, through the complex factor $s_n$, the case of different amplitudes and phases for each of the tones from the transmitting unit.

Suppose the angular frequency offset is $v$. The angular Doppler frequency $\omega_d$ is assumed independent of the tone, i.e. narrow bandwidth. In the more general case of multiple antenna elements described in the referenced patent application, the Doppler frequency shift is related to the actual location and velocity vectors by the derivative of the delay, as given by $$\omega_d \cong \omega_n \dot{\tau}_{klS}, \text{ where the delay derivative is given by} \quad (7)$$

$$\dot{\tau}_{klS} = \dot{\tau}_{klS}(x_S, y_S, z_S; v_{xS}, v_{yS}, v_{zS})$$

$$\equiv \frac{1}{c} \frac{v_{xS}(x_{kl} - x_S) + v_{yS}(y_{kl} - y_S) + v_{zS}(z_{kl} - z_S)}{\sqrt{(x_{kl} - x_S)^2 + (y_{kl} - y_S)^2 + (z_{kl} - z_S)^2}}$$

With this notation, one embodiment of our system and is method is for each base station to estimate initial phasors $\tilde{r}_{kmn}$ and frequencies $\alpha_k$, for instance by a least mean squared fit to the received time-varying phasors:

$$\min_{\alpha_k, \tilde{r}_{kmn}} \sum_{m,n} \int dt |r_{kmn}(t) - \tilde{r}_{kmn} e^{\alpha_k t}|^2 \quad (8)$$

The resulting parameters, frequency, complex phasor, time of measurement, etc., are forwarded to a processor at a control center.

In a single-antenna, two-tone embodiment, the processor may average the frequency measurements and uses the locator function in (1) as the function in Step 2.

In an embodiment with multiple pairs of tones where Doppler is not considered, the processor may average the frequency measurements and use the locator function in (9) below:

$$\hat{A}(x, y, z) = \sum_q |S_{n1(q)}||S_{n2(q)}| \left| \sum_k r_{kln_1(q)} \dot{r}_{kln_2(q)} e^{-j\tau_{kl}(\omega_{n_1(q)} - \omega_{n_2(q)})} \right| \quad (9)$$

In an embodiment with multiple individually transmitted pairs of tones with Doppler, the motion (speed and direction) is estimated by a best fit to the Doppler measurements, by one of many known means, while the location is estimated by using (9) above.

In an embodiment with multiple pairs of tones with Doppler, the motion and location vectors may be estimated by a joint maximization of the form:

$$\hat{A}(x, y, z, v_x, v_y, v_y) = \max_v \sum_q |S_{n_1(q)}||S_{n_2(q)}|$$

$$\left| \sum_k \left| \frac{\sin(T(\omega_k - v - \omega_c \dot{t}_k))}{\omega_k - v - \omega_c \dot{t}_k} \right|^2 r_{kln_1(q)} \dot{r}_{kln_2(q)} e^{-j\tau_{kl}(\omega_{n_1(q)} - \omega_{n_2(q)})} \right|$$

where $\tau_k$, given for instance by (6), depends of the location coordinates, and $\dot{\tau}_k$, given for instance by (7), depends on the motion vector as well as the location coordinates. In the absence of noise, the functions in (1), (9), and (10) peak at the correct location and motion, as can be seen by substituting (4) into each function.

Finding the Maximum:

There are many well-known techniques for finding a local maximum. It is known that, within a given region, there always is a point with the largest value. A simple method of searching for a maximum of a function F(x,y) in two dimensions is to start with a step size d. Given a point $(x_n, y_n)$, evaluate $F(x_n, y_n)$, $F(x_n+d, y_n)$, $F(x_n, y_n+d)$ and choose as the next point the one with the largest value of the function F. If the largest in value is $F(x_n, y_n)$, change the step size to $-d/2$. Repeat the process until the step size reaches a value smaller than the desired accuracy.

Another common method is known as the gradient method. In the examples of Equations (1), (9), and (10), the locator function has a continuous derivative, which we car calculate based on the received values. The gradient algorithm simply moves the point towards the maximum by following the gradient of the locator function. Thus we can iterate using, for example in the case of two variables, $$x_{n+1} = x_n + \alpha F_x(x_n, y_n)$$

$$y_{n+1} = y_n + \alpha F_y(x_n, y_n) \quad (11)$$

The above methods are two examples of known methods that find a local maximum. When there are several local maxima, we can apply several simple methods to find the largest local maximum within a region. One such method is to subdivide the region into a grid fine enough to guarantee only one maximum within each sub-region defined by the grid, starting a search like one of the above algorithms from the grid point with the maximum value. Another method, specifically suitable for our location method, is use an auxiliary locator function that has broader peaks and is only likely to have one peak within the region if interest. Starting from the point of the maximum of the auxiliary function, we then use one of the known search methods for the maximum of the full locator function. The auxiliary function can be generated from a subset of the terms in the expression for the full locator function (e.g. Equations (1), (9), and (10)). For instance, in a system with two closely spaced tones and two widely spaced antennas at each base station, we can first maximize using only terms that are independent on angle-of-arrival. Starting at the resulting value, we can then use all the terms to refine the location estimate. While this discussion is provided for illustrative purposes, and describes only functions of two variables, it is easily extended to functions of any number of variables using known calculus methods.

If the locator function A(x,y) defined above is plotted in three dimensions against x and y, the optimum estimate of the true location (x,y) in our process is the point (x,y) at which this decision function A(x,y) reaches its maximum value. In the position location process of the invention, the coordinates (x,y) that maximize A(x,y) are taken as the most likely object location. The function A(x,y) may be maximized by standard techniques such as an iterative search to converge to the maximum through trial-and-error and gradient search.

In one specific embodiment of the invention, we find the maximum of the locator function A(x,y) by converging iteratively to the location (x,y) being sought. In this embodiment, an initial estimate of (x,y) can be obtained by triangulation.

In the preferred embodiment of the invention, such a preliminary estimate of the average location is only used as the initial value in the process for the accurate determination of object location. The process then proceeds to improve on the initial estimate by performing a further iterative search for the best estimate of the desired location of the maximum of A(x,y). It is one of the important features of the invention that such a preliminary estimate, located somewhere in the space surrounded by all the likely intersections, can be defined more precisely, and its accuracy can be greatly improved by defining a composite function of the difference individual measurements.

A further refinement of the process of the invention described herein consists of also taking into account other information of the location signal returned from the object and received at the several base stations and at the several frequencies. This is accomplished by applying weights to the phasors (and their conjugates), and allocating a higher weight to those phasors which display a stronger signal (or less noise), and/or indicate less multipath perturbation (i.e., less amplitude modulation). In this manner the potential location error is further minimized. One optimization approach used to maximize the locator function A(x,y) is described as follows:

1. Set $(x_0, y_0)$ to the initial estimate and the search grid size h to 100 ft (for example).
2. Calculate A(x,y) values at the five points:
   $A(x_0, y_0)$,
   $A(x_0+h, y_0)$
   $A(x_0-h, y_0)$
   $A(x_0, y_0+h)$ and
   $A(x_0, y_0-h)$.
3. Assuming $A(x_0+h, y_0)$, and $A(x_0, y_0+h)$ are the two largest corner point values, also calculate $A(x_0+h, y_0+h)$.
4. Find the maximum, $(\hat{x}, \hat{y})$, of a parabolic surface through these six points.
5. If $(\hat{x}, \hat{y})$ is further than h from $(x_0, y_0)$ repeat the process for $(x_0, y_0)=(x_0+h, y_0+h)$, adding three new points in that direction.
6. If $(\hat{x}, \hat{y})$ is less than h from $(x_0, y_0)$ use $(\hat{x}, \hat{y})$ as the final estimate.

Thus, from the foregoing description it will be seen that one advantage of the position location approach of the invention is that its use permits the combining of DF and TDOA methods in a predetermined numerical fashion based on sound analytical foundations and the reliance on the common assumption about Gaussian characteristics of additive noise. Another advantage of the invention is that weak signals, which are less reliable, receive less weighting. Yet another advantage is that the effect of signals interfered with by multipath (which can be detected from envelope modulation) can be de-emphasized by having them given less weight, or even eliminated from the computation.

SUMMARY

Our system and method described herein differ from known art in that, instead of plotting various loci of equidistant points and trying to fit the transmitter in their center, we evaluate a locator function and determine its maximum. Our method does not require the estimation of time differences of arrival, and is also distinguished by the key feature that the estimate is improved by the use of the measured amplitudes, not just phases, of the received complex phasors.

While this invention has been particularly shown and described with references to preferred embodiments thereof, it will be understood by those skilled in the art that various changes in form and details may be made therein without department from the spirit and scope of the invention as defined by the appended claims.

What is claimed is:

1. A position location system comprising:

a transmitting unit comprising a transmitter that transmits a locating signal composed of multiple tones;

at least three antennas located at at least two base stations which receive the locating signal;

at least one receiver coupled to each antenna that generates representative complex signals indicative of amplitude and phase of at least two selected tone components of the locating signal as received at the corresponding antenna, the receiver also generating values indicative of the frequencies of received tone components; and a processor that receives the representative complex signals from the antenna and uses the amplitude and phase information in said representative complex signals and the generated frequency values to define a locator function for the transmitting unit, and determines estimated location coordinates for the transmitting unit that generate a maximum value of the locator function.

2. The position location system of claim 1 wherein the processor uses the received values indicative of the frequencies to eliminate frequency offsets of the transmitting unit to estimate location more accurately.

3. The position location system of claim 1 wherein the processor uses the received values indicative of the frequencies to estimate both motion and velocity of the transmitting unit.

* * * * *